United States Patent
Kolanowski et al.

(10) Patent No.: US 11,192,526 B2
(45) Date of Patent: Dec. 7, 2021

(54) DEVICE AND METHOD FOR WIPING AND/OR CLEANING A GLAZED SURFACE OF A VEHICLE USING AN ACTIVE LIQUID

(71) Applicant: Valeo Systèmes d'Essuyage, Le Mesnil Saint Denis (FR)

(72) Inventors: Grégory Kolanowski, Issoire (FR); Denis Thebault, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 305 days.

(21) Appl. No.: 16/345,481

(22) PCT Filed: Oct. 20, 2017

(86) PCT No.: PCT/EP2017/076916
§ 371 (c)(1),
(2) Date: Apr. 26, 2019

(87) PCT Pub. No.: WO2018/077760
PCT Pub. Date: May 3, 2018

(65) Prior Publication Data
US 2019/0248337 A1 Aug. 15, 2019

(30) Foreign Application Priority Data
Oct. 28, 2016 (FR) ...................... 1660497

(51) Int. Cl.
*B60S 1/08* (2006.01)
*B60S 1/60* (2006.01)
*B60S 1/48* (2006.01)

(52) U.S. Cl.
CPC ................. *B60S 1/08* (2013.01); *B60S 1/482* (2013.01)

(58) Field of Classification Search
CPC ...... B60S 1/08; B60S 1/06; B60S 1/60; B60S 1/46
See application file for complete search history.

(56) References Cited

U.S. PATENT DOCUMENTS

2007/0234500 A1* 10/2007 Holmes .................. B60S 1/566
15/250.003

FOREIGN PATENT DOCUMENTS

| FR | 2957574 A1 | 9/2011 |
| FR | 2957873 A1 | 9/2011 |
| FR | 3006965 A1 | 12/2014 |

OTHER PUBLICATIONS

International Search Report and Written Opinion in corresponding International Application No. PCT/EP2017/076916, dated Dec. 22, 2017 (10 pages).

* cited by examiner

*Primary Examiner* — Michael D Jennings
(74) *Attorney, Agent, or Firm* — Osha Bergman Watanabe & Burton LLP (57) ABSTRACT

The invention relates to a device for wiping and cleaning a glazed surface (S) of an automotive vehicle, comprising at least: —one direct current electric motor (7) rotating in a single direction and capable of moving at least one "wiper arm" unit (BB) formed by a drive arm (1) and a wiper blade (2) by means of a linkage (14), said "wiper arm" unit being moved according to an angular reciprocating movement between a rest position (11) and an end position (12) opposite the rest position (11) in relation to an angular sector (13) on the glazed surface (S), —a device (15) for dispensing an active liquid on the glazed surface (S), the active liquid preferably being a de-icing liquid or an insect-removing liquid, —a control means (10) configured to control, on the one hand, the operation of the motor (7) in order to stop (Continued)

the "wiper arm" unit (BB) for a non-zero duration and, on the other hand, the dispensing of the active liquid by the dispensing device (15). The invention also relates to a wiping and cleaning method implementing such a device.

14 Claims, 3 Drawing Sheets

DEVICE AND METHOD FOR WIPING AND/OR CLEANING A GLAZED SURFACE OF A VEHICLE USING AN ACTIVE LIQUID

The invention relates to the fields of wiping and/or cleaning glazed surfaces of a motor vehicle. It concerns more particularly devices and methods enabling cleaning of those glazed surfaces with the aid of a specific product of greater effectiveness than a conventional window washer liquid and finds a particularly advantageous application in the field of de-icing of or insect-removal from glazed surfaces of this kind, in which preferred but not exclusive applications the invention will preferentially be described in the present document.

Window wipers for motor vehicles are designed to sweep away liquids and dirt that may disturb the driver's view of their environment. These window wipers generally comprise one or more drive arms that effect an angular to-and-fro movement about a rotation axis and elongate wiper blades equipped with wiper rubbers made from an elastic material, each wiper blade being carried by a drive arm. In rubbing against a front or rear glazed surface of the vehicle, the wiper rubbers sweep away the water and some of the dirt and evacuate them out of the driver's field of view. In its angular to-and-fro movement over the glazed surface, the assembly formed by each drive arm and the wiper blade that it carries is mobile between a rest position in which it is positioned before a wiping and/or cleaning operation commences, i.e. at the bottom of the windshield and in the vicinity of the hood of the vehicle, and an extreme position that corresponds to the position farthest from the rest position reached by the "wiper arm" unit in its angular movement, i.e. opposite the rest position relative to the total angular portion over which the "wiper arm" unit travels.

It is known to modify the movement of the "wiper arm" unit by dividing the total angular portion into elementary angular sectors between which the "wiper arm" unit is stopped for a particular time between two movements. The "wiper arm" unit therefore effects successive movements over the glazed surface between the rest position and the extreme position interrupted by pauses. After each of these successive movements an active liquid is sprayed onto the glazed surface and allowed to act for a particular time. In a method of this kind the motor routinely used to drive the angular movements and the stop times of the "wiper arm" unit is an electric stepper motor, known as an electronic motor. That electronic motor is able to control at all times the angular position and the rotation direction of the "wiper arm" unit. To this end, a motor of this kind carries control electronics, sensors and generally components that significantly increase the operating cost of a motor of this kind. This increases the cost of the vehicle and limits the placement of such cleaning devices to entry level or middle of the range vehicles.

An aim of the present invention is to propose a device for deicing, or more generally cleaning a glazed surface of a vehicle with the aid of a specific active liquid, i.e. a liquid different from the window washer liquid contained in the window washer tank of the vehicle, that has a low cost and that is simple to control at relatively low cost.

To achieve its object, the invention proposes a device for wiping and cleaning a glazed surface of a motor vehicle, comprising at least:
 a direct current electric motor rotating in a single direction and capable of moving at least one "wiper arm" unit formed by a drive arm and a wiper blade by means of a linkage, said "wiper arm" unit being moved according to an angular to-and-fro movement between a rest position and an end position opposite the rest position in relation to an angular sector of the glazed surface,
 a device for dispensing an active liquid onto the glazed surface, the active liquid preferably being a de-icing liquid or an insect-removing liquid,
 a control means configured to control, on the one hand, the operation of the motor in order to stop the "wiper arm" unit for a non-zero duration and, on the other hand, the dispensing of the active liquid by the dispensing device.

The invention therefore makes provision for the use of a low cost electric motor in the context of a method adapted to deice or to remove insects from a glazed surface of a vehicle. The control means is configured to interrupt the supply of electrical power to the motor for a non-zero time while the active liquid is sprayed onto the glazed surface.

The wiping and cleaning device according to the invention may have any of the features listed hereinafter, separately or in combination:
 the control means is configured to control the operation of the motor in such a manner as to stop the "wiper arm" unit when the "wiper arm" unit is in its rest position and/or its extreme position,
 the dispensing device comprises at least one set of dispensing nozzles arranged on the wiper blade, on the drive arm, or on one of these two components,
 the dispensing device comprises at least one tank for storing an active liquid, a set of pipes for feeding said active liquid between the storage tank and the distribution nozzles, and a pump adapted to circulate this active liquid in this set of pipes and these dispensing nozzles,
 the control means control the motor via a succession of orders to start and stop the latter,
 the control means is configured to control the dispensing of active liquid and the motor with a non-zero time shift between them.

Thus the invention proposes exclusively time-domain control of the entirety of the operation effected with the aid of the active liquid, whether that be a de-icing operation or any other type of specific operation for which the use of a conventional window washer liquid is not sufficient. By using a time shift between the control of the active liquid circulation pump and the control of an angular movement of the "wiper arm" unit, the invention makes it possible to disregard the inertia of the fluid circuit consisting of the feed pipes and the dispensing nozzles and to guarantee the presence of a predefined quantity of that active liquid on the glazed surface at the moment when the "wiper arm" unit effects an angular movement. When the active liquid has been sprayed onto the glazed surface before any movement of the wiper blade, a time shift of this kind also allows the liquid to act, i.e. to melt the ice or the snow or to dissolve the organic material of insects.

Moreover, the device according to the invention may comprise a device for spraying a cleaning liquid, in particular a window washer liquid, distinct from the active liquid dispensing device, although the two devices may have common parts. To this end, the device according to the invention may also comprise a device for spraying a cleaning liquid, in particular a window washer liquid, that comprises a jar containing said liquid distinct from the active liquid storage tank. At least some feed pipes and dispensing nozzles are taken by the cleaning liquid and by the active liquid.

Said spraying device may comprise a supplemental pump adapted to circulate the cleaning liquid in this set of pipes and these dispensing nozzles.

The wiping and cleaning device according to the invention may further have any of the features listed below:
- the active liquid is a de-icing liquid; a liquid of this kind comprises an active principle that causes the ice or the snow to melt in between 2 and 90 seconds,
- the active liquid is an insect removing liquid; a liquid of this kind comprises an active principle that dissolves the organic material of the insects crushed on the glazed surface in between 2 and 60 seconds,
- the control means are integrated into a system for controlling a window wiper device of the vehicle,
- the wiping and cleaning device according to the invention may be actuated automatically on the basis of a signal generated by a sensor that represents the state of the glazed surface (S) in question,
- alternatively or additionally, the control means are activated by a user of the vehicle by means of a specific interface attached to the vehicle or by means of an appropriate mobile interface with the controlled system of the window wiper device of the vehicle.

According to one feature of the invention the aforementioned control means control the motor via a succession of orders to start and to stop the latter. The control of this motor is therefore controlled as a function of time and is no longer angular control as a function of the position of the "wiper arm" unit on the glazed surface.

The invention therefore enables wiping and/or cleaning of a glazed surface of the vehicle by means of a specific active liquid, different from a window washer liquid as conventionally used, using simple and flexible means of relatively low cost because control in the time domain of the DC motor and control in the time domain of the time shift between control of that motor and control of the active liquid circulation pump by the same control means can be adjusted as a function of predefined parameters that are easily modifiable.

The invention also encompasses a method of wiping and cleaning a glazed surface using a wiping and cleaning device as defined in the present document, in which method:
- the control means activates the motor and the dispensing of active liquid with a non-zero time shift between them, distribution of active liquid preferably being activated before the motor.

The method according to the invention may equally provide for the control means to activate the motor and the dispensing of active liquid simultaneously during a period of the method.

The method for wiping and cleaning a glazed surface may preferably be such that:
- the control means activates the motor to move the "wiper arm" unit from the rest position to the extreme position on the glazed surface,
- the control means deactivates the motor after a first particular time corresponding to the time necessary to move from the rest position to the extreme position,
- the control means activates the dispensing of the active liquid and keeps the motor deactivated for a time corresponding to the filling of the dispensing device with the active liquid. This time corresponds to the filling of the dispensing device is advantageously defined so that the quantity of active liquid fed by the pump is sufficient to fill the pipes of the active liquid feed circuit and sufficiently low for no active liquid to be dispensed onto the glazed surface at this stage,
- the control means activates the motor and the dispensing device simultaneously for a second time corresponding to the time necessary to move from the extreme position to the rest position. The angular movement of this "wiper arm" unit during this step is therefore effected simultaneously with the dispensing of active liquid via the dispensing nozzles arranged for example on the wiper blade, until said "wiper arm" unit has reached its rest position. In particular this enables uniform dispensing of the active liquid onto the glazed surface,
- the control means deactivate the motor and the dispensing device and keeps them deactivated for a time of action of the active liquid. This action time is advantageously defined so that the active liquid deposited on and spread over the glazed surface during the preceding step has time to act on the substance to be removed from the glazed surface, whether it be frost or ice, or is some other substance, in particular an organic material.

According to different variant embodiments, the invention may be such that the operation carried out on the glazed surface is completed at the end of this last step, or that at the end of this fourth step a new cycle of the steps described above is again commanded, and so on until the operation effected on the glazed surface is considered finished. In this case an appropriate sensor could advantageously be positioned facing the glazed surface in question, being a sensor adapted to generate a signal representing the state of that surface and to transmit that signal to the control means, and that control means will be configured to perform as many iterations of the cycle of steps described above as necessary until the signal representing the state of the glazed surface assumes a predefined value.

According to one option, before the activation of the motor to move the "wiper arm" unit from the rest position to the extreme position on the glazed surface, the control means activates the dispensing of the active liquid onto the glazed surface and keeps the motor deactivated for a time of action of the active liquid.

According to another option, simultaneously with the activation of the motor to move the "wiper arm" unit from the rest position to the extreme position on the glazed surface, the control means activates the dispensing of the active liquid onto the glazed surface.

According to one embodiment, the activation of the motor to move the "wiper arm" unit from the rest position to the extreme position on the glazed surface is effected by a plurality of successive steps and stopping times.

When the extreme position has been reached, the control means deactivates the motor and the dispensing device and keeps them deactivated for a time of action of the active liquid.

As has just been described, the method according to the invention is a simple method consisting of a limited number of steps that can be controlled in a simple and relatively low cost manner. It is moreover of relatively limited duration: of the order of a few seconds to one or two minutes for all of the steps, which facilitates its use.

Those different variants as well as other features and advantages of the present invention are described in detail in the following description supported by the following drawings:

It is first to be noted that although the figures disclose the invention in a detailed manner for its execution, they may of course serve to define the invention better if necessary.

The invention is described hereinafter in its preferred application to deicing a glazed surface of a motor vehicle. For example this may be deicing a windshield of such a vehicle. It is nevertheless to be understood that the invention also finds a preferred application in removing insects from a glazed surface of a motor vehicle, in particular its windshield.

Figure 1:
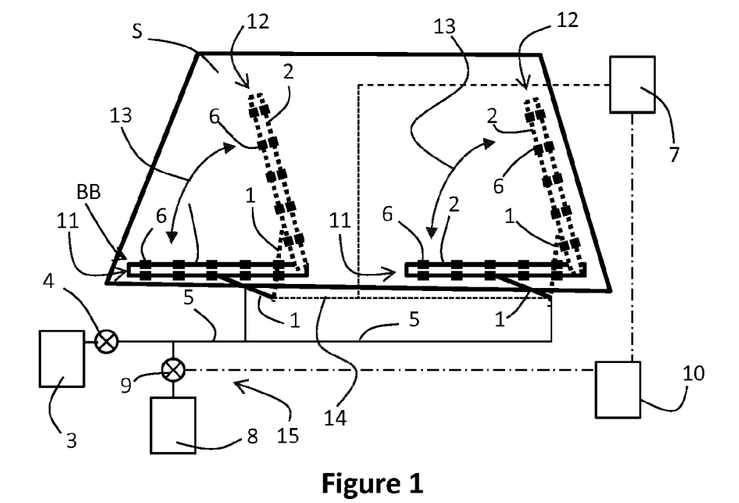
FIG. 1 is a diagrammatic view of a device according to the invention arranged on a windshield of a motor vehicle.

Referring to FIG. 1, a glazed surface S of a motor vehicle is equipped with a wiping and cleaning device comprising one or more wiper arms 1 each carrying a wiper blade 2. Hereinafter each wiper arm 1 and the wiper blade 2 that it carries are considered as a unit designated by the overall term "wiper arm" unit BB. In the example illustrated by FIG. 1 there are therefore two "wiper arm" units BB arranged on the glazed surface S.

To remove as much dirt as possible from that glazed surface S the wiping and cleaning device may comprise a device for spraying window washer liquid comprising a window washer liquid jar 3 connected by a circulation pump 4 and a central feed pipe 5 to a set of dispensing nozzles 6 arranged on each wiper blade 2. According to the example illustrated by FIG. 1, the dispensing nozzles 6 are arranged longitudinally on each side of each wiper blade 2. According to a variant embodiment these dispensing nozzles 6 may equally be disposed on only one side of the wiper blade 2.

Dispensing nozzles of this kind may alternatively or additionally be provided on a hood of the vehicle, on a windshield frame of the vehicle or on the drive arm 1 of the wiper blade 2.

During an operation of wiping and/or cleaning the glazed surface S each "wiper arm" unit BB is driven by a motor 7 to move with an angular to-and-fro movement over the glazed surface S. To be more precise, there are represented in FIG. 1, respectively in solid line and in dashed line, the rest position 11 and the extreme position 12 that each "wiper arm" unit BB is able to assume on the glazed surface S during an operation of wiping and/or cleaning the latter. Between this rest position and the extreme position the "wiper arm" unit travels over an angular sector 13 of the windshield the summit of which coincides with the rotation axis of the drive arm 1.

The rest position 11, in solid line, represents the position of each "wiper arm" unit BB before the wiping and/or cleaning operation commences. According to the example represented in FIG. 1, in this rest position each "wiper arm" unit BB is disposed in the lower part of the glazed surface S, for example along a windshield frame. The extreme position 12, in dashed line in FIG. 1, corresponds to the position farthest from the rest position that the "wiper arm" unit BB assumes during the operation of wiping and/or cleaning the glazed surface S. The extreme position 12 and the rest position 11 flank the angular sector 13 in the circumferential direction. The extreme position 12 is that in which the wiper blade 2 is parallel or substantially parallel to one of the windshield pillars of the vehicle.

According to the invention, the motor 7 is a single rotation direction direct current electric motor. As is known, by rotating at a substantially constant speed Ω in the same rotation direction it drives the "wiper arm" unit BB via a linkage system 14 in a to-and-fro movement between the rest position 11 thereof and the extreme position 12 thereof. Reliable and robust, a motor of this kind is moreover of low cost and easy to mass produce. A motor of this kind always rotates in the same rotation direction. It may comprise three brushes for controlling it at low speed and at high speed.

To carry out a specific cleaning of the glazed surface S or to deice the latter by means of an appropriate active liquid, the invention provides a device 15 for dispensing the so-called active liquid. This liquid is qualified here as active to distinguish it from the window washer liquid contained in the jar 3. It is active in the sense that its melting or dissolving power, in particular with regard to insects, is fast compared to that of the window washer liquid.

A dispensing device 15 of this kind may comprise a tank for storing that active liquid, equipped with a circulation pump 9, the storage tank 8 and the circulation pump 9 being connected to the set of feed pipes 5 and by the latter to the dispensing nozzles 6 arranged on the wiper blades 2.

According to different embodiments of the invention, the active liquid circulation pump 9 may be distinct from the window washer liquid circulation pump 4, or these two pumps may be one and the same, a set of valves being advantageously provided to enable the circulation of one or the other of those fluids.

According to the example shown in FIG. 1, the same pipes and dispensing nozzles are shared by the active liquid dispensing device 15 and by the window washer liquid sprayer device. Alternatively, the wiping and cleaning device according to the invention may comprise two distinct circuits, the first of them being dedicated to the active liquid dispensing device and the second being specific to the window washer liquid sprayer device.

The device according to the invention also includes control means 10 adapted to command and control, on the one hand, starting and stopping the motor 7 and, on the other hand, starting and stopping the dispensing of active liquid, notably by controlling the pump 9 for circulating that active liquid. It is clearly apparent that, in the situation where the active liquid circulation pump 9 and the window washer liquid circulation pump 4 are one and the same, the control means 10 are advantageously adapted to control selectively the set of valves enabling the specific circulation of one or the other of those fluids. The control means 10 are advantageously configured to supply or to interrupt the supply of electrical energy to the electric motor 7. The latter is therefore controlled in the time domain by the time interval between a starting command and a stopping command.

The control means 10 intended to command and control starting and stopping of the motor 7 include a position sensor. One or more sensors may in particular be adapted to detect the extreme position or the rest position of the "wiper arm" unit BB.

According to one feature of the invention, the control means 10 are able to interrupt the supply of electrical power to the motor 7 when at least one of the "wiper arm" units BB is in its extreme position defined above. According to different variant embodiments of the device according to the invention, the control means 10 are also able to interrupt the supply of electrical power to the motor 7 when at least one of the "wiper arm" units BB is in its rest position defined above.

It is also advantageous if the control means 10 are able to generate a signal on starting the motor 7 and/or the active liquid circulation pump 9 with one or more predefined time shifts between them depending on the specific wiping and cleaning method used. When the pump 9 is activated first, a shift of this kind forms an anticipation time during which the dispensing device is filled with the active liquid. Actually, prolonged stopping of the pump 9 leads to draining of the nozzles and the feed pipes. This time shift, otherwise termed a filling time, guarantees good filling of the dispensing device 15, and liquid is then ready to be sprayed when the user commands the spraying of active liquid.

FIGS. 2 to 5 show diagrammatically the unfolding of different variant embodiments of the method according to the invention. As indicated above, the application chosen here is that of deicing a glazed surface S equipped with a device like that which has just been described and is shown diagrammatically in FIG. 1. FIGS. 2 to 5 are diagrams in which the abscissa axis is that of time and in which the ordinate axis represents a characteristic parameter of the operation or the stopping, respectively, of the motor 7 and of the distribution of active liquid, in particular of the operation of the active liquid circulation pump 9. These characteristic parameters, not detailed in the figures, may by way of non-exhaustive example be, for the motor 7, a current, a voltage or a binary signal representing the on or off state of that motor. For the active liquid circulation pump 9 this characteristic parameter may equally be by way of nonlimiting example a binary signal representing the on or off state of that pump.

In each of FIGS. 2 to 5 the lower curve represents the state of the motor 7 and the upper curve represents the state of the dispensing device 15, in particular that of the active liquid circulation pump 9. Finally, regardless of the variant embodiment concerned, the device according to the invention is, in the initial state of the method according to the invention, in the rest position, i.e. each "wiper arm" unit BB is in its rest position and the motor 7 and the active liquid circulation pump 9 are stopped.

Figure 2:
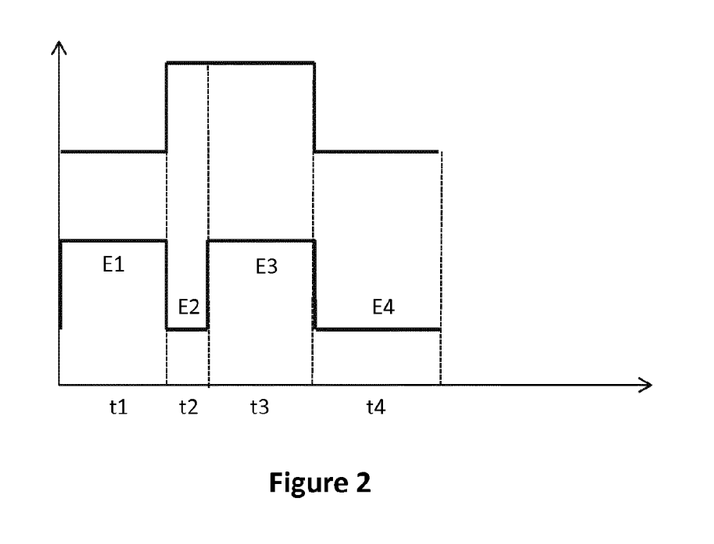
FIG. 2 is a diagrammatic representation of the unfolding of a first embodiment of the method according to the invention.

Referring to FIG. 2, which shows a first embodiment of the method according to the invention, the latter includes a first step E1, of first time t1, during which the motor 7 is activated and the active liquid circulation pump is stopped. During this first step E1 no active liquid is therefore dispensed and movement of each "wiper arm" unit BB is driven by the motor 7. According to one feature of the invention, the first time t1 of the first step E1 is defined so that each "wiper arm" unit BB passes during this first step from its rest position to its extreme position defined above. The first time t1 of this first step E1 is therefore typically of the order of a few tenths of a second to one or two seconds.

In a second step E2 of the method according to the invention the motor 7 is stopped and, simultaneously with this stopping of this motor 7, the active liquid circulation pump 9 is started for a time t2 corresponding to the time to fill the dispensing device 15 with the active liquid. According to the invention, the time t2 of this second step is defined so that the quantity of active liquid that circulates during this time t2 is sufficient for the active liquid to fill the feed pipes 5 whilst nevertheless being sufficiently short for no active liquid to be delivered by the dispensing nozzles 6. By way of nonlimiting example, the time t2 of this second step E2 may be of the order of a few tenths of a second. During this second step E2 of the method according to the invention, while each "wiper arm" unit BB is stopped in its extreme position, the feed circuit of the dispensing device 15 of the wiping and cleaning device in accordance with the invention of the vehicle is filled with active liquid.

In a third step E3 of the method according to the invention, of duration t3, the motor 7 is started again, the active liquid circulation pump 9 continuing to operate. According to the invention, the duration t3 of the third step E3 is substantially equal to the first duration t1 of the first step E1 and is defined so that, during this period, each "wiper arm" unit BB returns from its extreme position to its rest position. The duration t3 of this third step E3 is therefore, in a similar manner to the first duration t1 of the first step E1, substantially of the order of a few tenths of a second to one or two seconds. In other words, during this third step E3 of the method according to the invention each "wiper arm" unit BB returns to its rest position and, simultaneously, a quantity of active liquid is delivered by the dispensing device 15, in particular via the dispensing nozzles 6. In its angular movement each "wiper arm" unit BB therefore spreads active liquid over the glazed surface S.

During this third step E3 at least some of the active liquid is sprayed in the direction of the extreme position of the "wiper arm" unit BB, i.e. into an area of the windshield opposite the direction of advance of the "wiper arm" unit BB, so that the wiper blades 2 do not wipe the sprayed active liquid immediately.

In a fourth step E4 of the method according to the invention, of duration t4, the motor 7 and the active liquid circulation pump 9 are simultaneously stopped. The duration t4 of this first step E4 corresponds to a time t4 for action of the active liquid on the glazed surface. A duration t4 of this kind is defined to allow the active liquid dispensed and spread during the third step E3 to act on the glazed surface S. By way of nonlimiting example, the duration t4 of this fourth step may be of the order of a few seconds to one minute.

According to the first embodiment, the method according to the invention is stopped at the end of the fourth step E4 described above and the user of the vehicle must command a new succession of the four steps described above if they consider that the de-icing operation has not been completed satisfactorily. According to other embodiments, a sensor generating a signal representing the state of the glazed surface S may be integrated into the device according to the invention. The four steps of the method according to the invention described above could then be reproduced in successive cycles until the signal generated by this sensor assumes a predefined value representing the completion of the deicing operation.

The method according to the invention just described includes few steps and is simple to control, since it employs a simple succession of orders for starting and stopping only two elements of the device according to the invention: the active liquid circulation pump 9 and the motor 7. By employing a one-way motor, this method is also of relatively low cost, and may therefore be implemented on a large number of vehicles.

Figure 3:
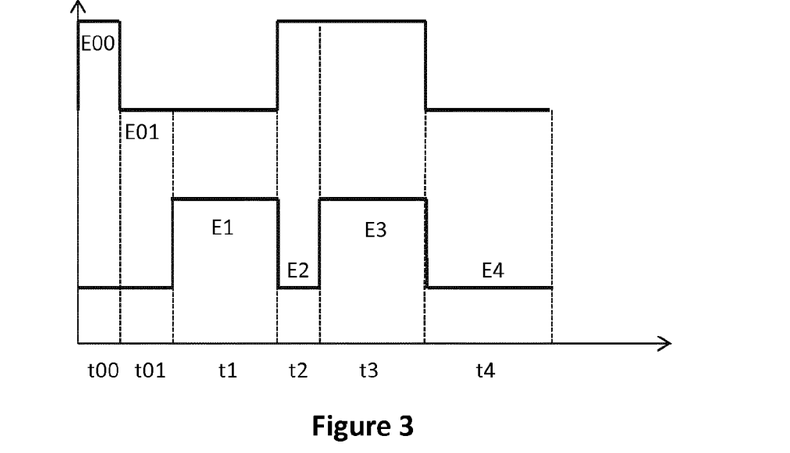
FIG. 3 is a diagrammatic representation of the unfolding of the method according to a first variant embodiment of the invention.
Figure 4:
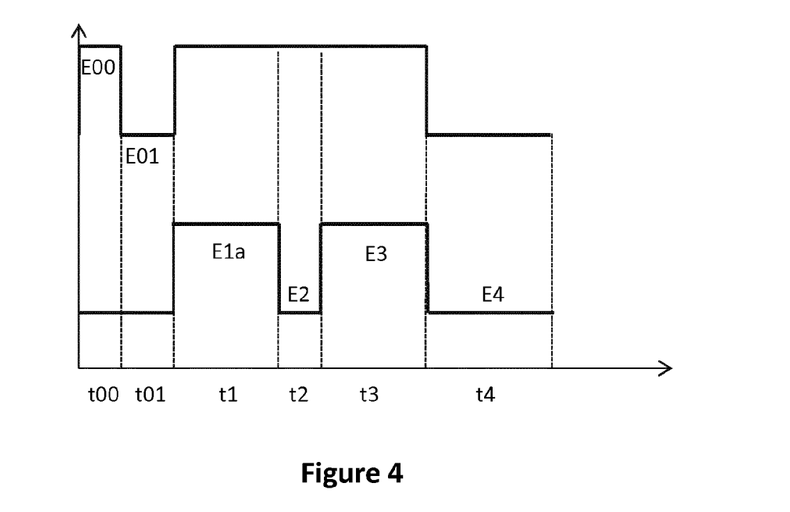
FIG. 4 is a diagrammatic representation of the unfolding of the method according to a second variant embodiment of the invention.
Figure 5:
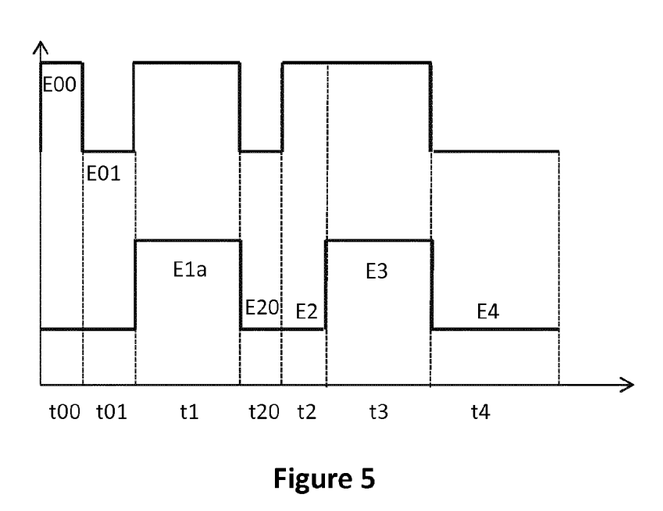
FIG. 5 is a diagrammatic representation of the unfolding of the method according to a third variant of the invention.

FIGS. 3, 4 and 5 show different variant embodiments of the method according to the invention as just described.

According to the first variant embodiment, more particularly shown in FIG. 3, two preliminary steps E00 and E01 of respective durations t00 and t01 are commanded before the first step E1 described above. To be more precise, during the first preliminary step E00, of duration t00, the active liquid circulation pump 9 is started, the motor 7 being stopped. The duration t00 of this first preliminary step is advantageously such that a predetermined quantity of active liquid is delivered by the dispensing device 15, in particular via the dispensing nozzles 6. Each "wiper arm" unit BB being in its rest position, it follows that the active liquid delivered is going to remain in the vicinity of each wiper blade 2 of each of these units and trickle around said wiper blades, impregnating them. By way of nonlimiting example, the duration t00 of this first preliminary step is advantageously of the order of a few tenths of a second to a few seconds.

During the second preliminary step E01, of duration t01, the dispensing device 15 is stopped, in particular by interrupting the supply of power to the active liquid circulation pump 9, and the motor 7 remains stopped. The duration t01 of this second preliminary step is advantageously defined to allow the active liquid to act on each wiper blade 2. This will make it possible to deice the wiper blade 2 as such, giving it back some flexibility and thus preventing damage to the wiper rubber of the blade. By way of nonlimiting example, this duration t01 may be of the order of a few seconds to one minute. The four steps E1, E2, E3, E4 described above are then commanded, in a similar manner to that disclosed above for the first embodiment of the method according to the invention. In other words, in this first variant embodiment the invention provides a first step of deicing each wiper blade 2 before de-icing the glazed surface S.

In a second variant embodiment the method is such that, simultaneously with the activation of the motor 7 to move the "wiper arm" unit BB from the rest position to the extreme position on the glazed surface S, the control means 10 activates dispensing of the active liquid onto the glazed surface S, in particular by supplying electrical power to the pump 9. This modification of the step E1, termed E1a, may be carried out as a first step of the method, or alternatively after execution of the two preliminary steps E00 and E01 described above. In this first step E1a, when each "wiper arm" unit BB moves from its rest position to its extreme position on the glazed surface S, a quantity of active liquid is delivered by the dispensing nozzle 6 and spread by said "wiper arm" units BB over the glazed surface S during their angular movement. Consuming more active liquid than the other embodiments described above, this second variant embodiment can nevertheless make it possible to improve the efficacy of the de-icing operation and can, for example, enable a single cycle of the steps E00 to E4 or Ea1 to E4 to suffice for complete deicing of the glazed surface, instead and in place of the repetition of a plurality of cycles of those same steps.

According to a variant that is not shown, the activation of the motor 7 to move the "wiper arm" unit BB from the rest position to the extreme position on the glazed surface S may equally be carried out by means of a plurality of successive steps and stop times. Instead of a continuous movement of the "wiper arm" unit BB from the rest position to the extreme position, there is then executed a series of steps in which during each stop the active liquid is sprayed onto the glazed surface.

The third variant embodiment, more particularly shown in FIG. 5, employs the step E1a described above in which the movement from the rest position to the extreme position is carried out simultaneously with dispensing the active liquid onto the glazed surface. In this variant a supplemental step E20 is effected between the modified first step E1a and the second step E2. To be more precise, during this supplemental step E20, of duration t20, the motor 7 is stopped, likewise the dispensing device 15, in particular by interrupting the supply of electrical power to the active liquid circulation pump 9. A quantity of active liquid having been delivered onto and spread over the glazed surface S during the first step E1a, this supplemental step E20 constitutes a step of action of that liquid, before restarting the active liquid circulation pump 9 and before resuming the movement of the "wiper arm" unit BB.

In other words, according to this third variant embodiment there are carried out successively:
during the first and second preliminary steps E00 and E01, deicing each wiper blade 2 by dispensing active liquid via the dispensing nozzles 6 (first preliminary step E00) and then by the action of that liquid (second preliminary step E01), each "wiper arm" unit BB remaining in its rest position,
dispensing and spreading active liquid onto and over the glazed surface S by the angular movement of each "wiper arm" unit BB between its rest position and its extreme position (first step E1a),
action of the liquid spread in this way over the glazed surface S (supplemental step E20),
filling of the fluid dispensing circuit (second step E2), this step possibly being optional if the fluid dispensing circuit has not been emptied,
dispensing and spreading active liquid onto and over the glazed surface S by the angular movement of each "wiper arm" unit BB between its extreme position and its rest position (third step E3),
action of the liquid spread in this way over the glazed surface S (fourth step E4).

Of course, diverse modifications may be made by the person skilled in the art to the device and the method that have just been described by way of nonlimiting example provided that there are employed at least a unidirectional motor and control means able, on the one hand, to control the angular movement of at least one "wiper arm" unit over the glazed surface to be deiced/cleaned and, on the other hand, to control an active liquid dispensing device used for the deicing/cleaning operation. The control of the angular movement of the at least one "wiper arm" unit may in particular include stopping of the "wiper arm" unit in its extreme position or its rest position.

Completion of the deicing operation may optionally include a sweeping cycle so as to evacuate the active liquid present on the windshield.

Completion of the deicing operation may also optionally include a cycle of rinsing the windshield using the window washer liquid stored in the jar 3.

In any event, the invention should not be seen as limited to the embodiments specifically described in this document, and in particular encompasses all equivalent means and any technically operative combination of those means. Thus it encompasses in particular situations in which the movement of the "wiper arm" unit or units from the rest position to the extreme position is effected not in a single continuous movement but in a succession of elementary steps during which this unit or these units effect elementary angular movements on the glazed surface.

The invention claimed is:

1. A device for wiping and cleaning a glazed surface of a motor vehicle, comprising:
    a direct current electric motor rotating in a single direction and capable of moving at least one wiper arm unit formed by a drive arm and a wiper blade by a linkage, said wiper arm unit being moved according to an angular to-and-fro movement between a rest position and an end position opposite the rest position in relation to an angular sector of the glazed surface;
    a dispensing device for dispensing an active liquid onto the glazed surface, the active liquid being a de-icing liquid or an insect-removing liquid; and a control means configured to control the operation of the motor in order to stop the wiper arm unit for a non-zero duration and to control the dispensing of the active liquid by the dispensing device, wherein the dispensing device dispenses a predetermined quantity of the active liquid for a predetermined time period during the non-zero duration when the wiper arm unit is at the rest position, and wherein dispensing the active liquid by the dispensing device is discontinued immediately following the predetermined time period.

2. The device as claimed in claim 1, wherein the control means is configured to control operation of the direct current electric motor in such a manner as to stop the wiper arm unit when the wiper arm unit is in the rest position, and wherein, prior to the wiper arm unit moving from the rest position, the predetermined quantity of the active liquid is dispensed to the wiper blade to deice the wiper blade.

3. The device as claimed in claim 1, wherein the dispensing device comprises at least one set of dispensing nozzles arranged on the wiper blade and/or on the drive arm.

4. The device as claimed in claim 1, wherein the dispensing device comprises at least one tank for storing the active liquid, a set of pipes for feeding the active liquid between the least one tank and a set of dispensing nozzles, and a pump adapted to circulate the active liquid in the set of pipes and the set of dispensing nozzles, and wherein, prior to the wiper arm unit moving from the rest position, the predetermined quantity of the active liquid fills the set of pipes without being delivered to the set of dispensing nozzles.

5. The device as claimed in claim 4, further comprising a device for spraying a window washer liquid that comprises a jar for retaining said window washing liquid separate from the storage tank for the active liquid, at least a part of the set of feed pipes and the dispensing nozzles being taken by the window washer liquid and by the active liquid.

6. The device as claimed in claim 1, wherein the control means control the motor via a succession of orders to start and stop the latter.

7. The device as claimed in claim 1, wherein the control means is configured to control the dispensing of active liquid and the motor with a non-zero time shift between them.

8. A method of wiping and cleaning a glazed surface, comprising:

activating, by a control means, a direct current motor and dispensing of active liquid with a non-zero time shift between them, distribution of active liquid being activated before the motor, the motor rotating in a single direction and moving a wiper arm unit according to an angular to-and-fro movement between a rest position and an end position opposite the rest position in relation to an angular sector of the glazed surface; and controlling, by the control means, the operation of the motor to stop the wiper arm unit for the non-zero duration and to control the dispensing of the active liquid by the dispensing device, wherein the dispensing device dispenses a predetermined quantity of the active liquid for a predetermined time period during the non-zero duration when the wiper arm unit is at the rest position, and wherein dispensing the active liquid by the dispensing device is discontinued immediately following the predetermined time period.

9. The method as claimed in claim 8, during which: the control means activates the motor and the dispensing of active liquid simultaneously during a period of the method.

10. The method as claimed in claim 8, during which: the control means activates the motor to move the wiper arm unit from the rest position to the extreme position on the glazed surface, the control means deactivates the motor after a first particular time corresponding to the time necessary to move from the rest position to the extreme position, the control means activates the dispensing of the active liquid and keeps the motor deactivated for a time corresponding to the filling of the dispensing device with the active liquid, the control means activates the motor and the dispensing device simultaneously for a second time corresponding to the time necessary to move from the extreme position to the rest position, the control means deactivate the motor and the dispensing device and keeps them deactivated for a time of action of the active liquid.

11. The method as claimed in claim 10, wherein, before the activation of the motor to move the wiper arm unit from the rest position to the extreme position on the glazed surface, the control means activates the dispensing of the active liquid onto the glazed surface and keeps the motor deactivated for a time of action of the active liquid.

12. The method as claimed in claim 10, during which, simultaneously with the activation of the motor to move the wiper arm unit from the rest position to the extreme position on the glazed surface, the control means activates the dispensing of the active liquid onto the glazed surface.

13. The method as claimed in claim 12, during which the activation of the motor to move the wiper arm unit from the rest position to the extreme position on the glazed surface is effected by a plurality of successive steps and stopping times.

14. The method as claimed in claim 12, in which, when the extreme position has been reached, the control means deactivates the motor and the dispensing device and keeps them deactivated for a time of action of the active liquid.

* * * * *